US 6,944,162 B1

(12) United States Patent
Hill et al.

(10) Patent No.: US 6,944,162 B1
(45) Date of Patent: Sep. 13, 2005

(54) TUPLE-BASED LOOKUP SCHEME FOR PACKET SWITCHING NODE

(75) Inventors: Rex A. Hill, San Diego, CA (US); Bryan Dietz, Lake Forest, CA (US); John Bailey, Agoura Hills, CA (US)

(73) Assignee: Alcatel, Paris (FR)

( * ) Notice: Subject to any disclaimer, the term of this patent is extended or adjusted under 35 U.S.C. 154(b) by 706 days.

(21) Appl. No.: 09/679,138

(22) Filed: Oct. 3, 2000

(51) Int. Cl.$^7$ ............................................. H04L 12/56

(52) U.S. Cl. ......................... 370/395.31; 370/395.32; 370/392

(58) Field of Search .................. 370/229, 241, 370/252, 254, 392, 902, 912, 395.31, 395.32; 707/3, 6

(56) References Cited

U.S. PATENT DOCUMENTS

| | | | | |
|---|---|---|---|---|
| 5,530,854 A | * | 6/1996 | Emery et al. ................ | 707/100 |
| 5,781,772 A | * | 7/1998 | Wilkinson et al. ............. | 707/3 |
| 5,946,679 A | * | 8/1999 | Ahuja et al. .................... | 707/3 |
| 6,011,795 A | * | 1/2000 | Varghese et al. ............ | 370/392 |
| 6,052,683 A | * | 4/2000 | Irwin ............................ | 707/8 |
| 6,145,064 A | * | 11/2000 | Long et al. .................. | 711/158 |
| 6,212,184 B1 | * | 4/2001 | Venkatachary et al. ..... | 370/392 |
| 6,532,516 B1 | * | 3/2003 | Krishna et al. ............. | 711/108 |
| 6,567,408 B1 | * | 5/2003 | Li et al. ................ | 370/395.31 |
| 6,574,666 B1 | * | 6/2003 | Dutta et al. ................. | 709/227 |
| 6,598,034 B1 | * | 7/2003 | Kloth .......................... | 706/47 |
| 6,651,099 B1 | * | 11/2003 | Dietz et al. ................. | 709/224 |
| 6,697,380 B1 | * | 2/2004 | Egbert et al. ............... | 370/469 |

OTHER PUBLICATIONS

Lampson, B. et al.; *IP Lookups using Multiway and Multi-column Search*; (internet papers); http://www-cse.ucsd.edu/users/varghese/publications.html; May 11, 1998; pp. 1-25.

Srinivasan, V. et al.; *Fast and Scalable Layer Four Switching*; (internet papers); http://www-cse.ucsd.edu/users/varghese/publications.html; 1998; 12 pp.

Srinivasan, V. et al.; *Faster IP Lookups using Controlled Prefix Expansion*; (internet papers); http://www.-cse.ucsd.edu/users/varghese/publications.html; Sep. 1998; 10 pp.

Srinivasan, V. et al.; *Packet Classification using Tuple Space Search*; (internet papers); http://www.-cse.ucsd.edu/users/varghese/publications.html; 1999; 12 pp.

Waldvogel, Marcel et al.; *Scalable High Speed IP Routing Lookups*; (internet papers); http://www.-cse.ucsd.edu/users/varghese/publications.html; Sep. 1997; 12 pp.

* cited by examiner

*Primary Examiner*—Bob Phunkulh
*Assistant Examiner*—Joshua Kading
(74) *Attorney, Agent, or Firm*—Craig A. Hoersten; V. Lawrence Sewell

(57) ABSTRACT

Lookup scheme in which a tuple representing a plurality of flow properties is parsed into multiple subtuples for application in recursive lookups. A first subtuple including a first subset of bits from the tuple is applied to the flow information database and returns a result including a nickname having a smaller bit count than the first subtuple. A second subtuple including a second subset of bits from the tuple and the nickname are combined and applied to the flow information database. The lookups continue until a result indicates that no recursion is required. The final lookup result includes flow information applicable to one or more of modifying, enqueuing or forwarding the packet. A truncated lookup capability enables common processing across a group of distinct flows having common flow properties.

8 Claims, 6 Drawing Sheets

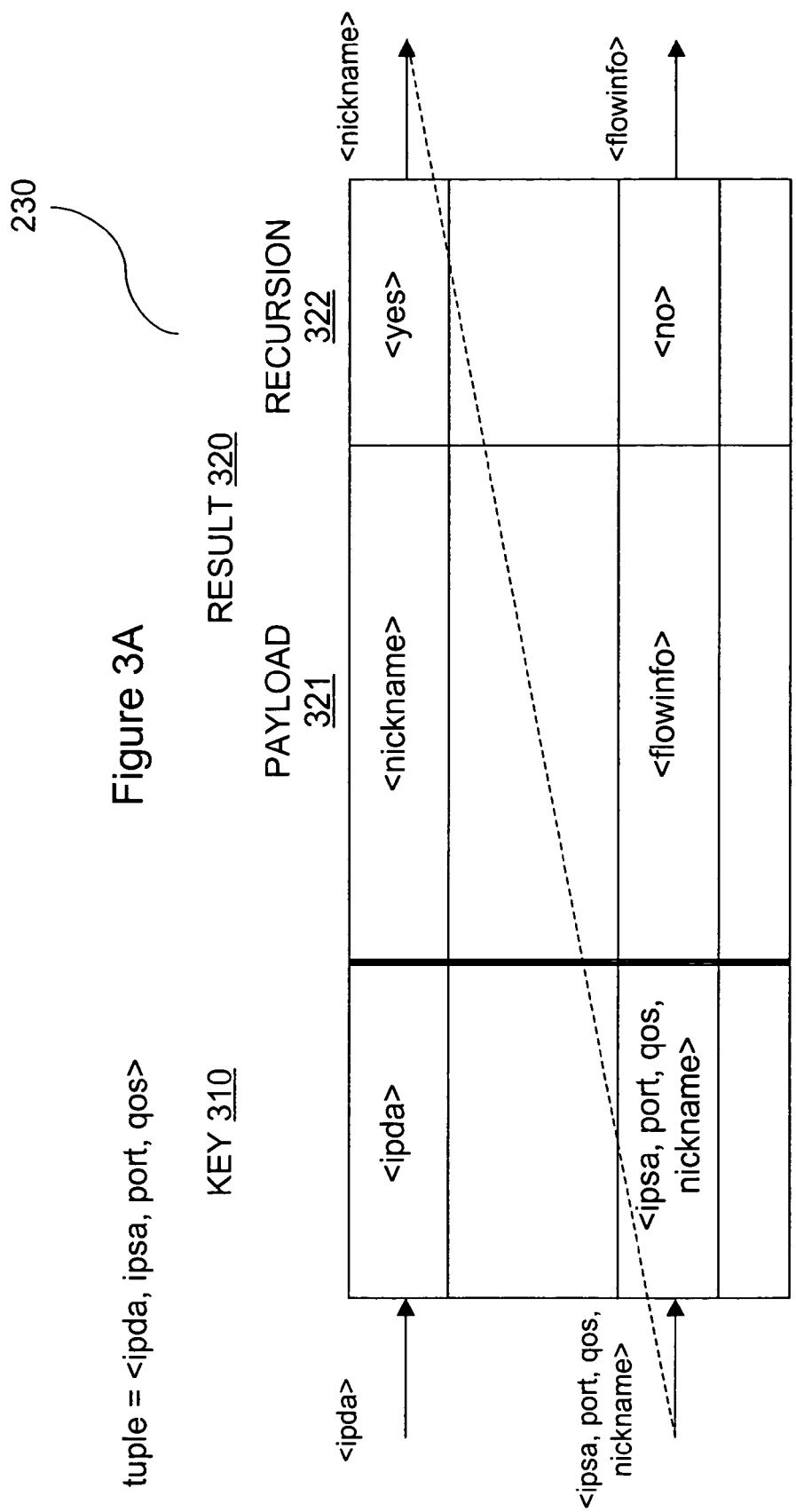

TUPLE-BASED LOOKUP SCHEME FOR PACKET SWITCHING NODE

BACKGROUND OF THE INVENTION

The present invention relates to packet processing and, more particularly, to tuple-based packet lookup schemes.

Many packet switching nodes classify packets into flows in order to facilitate packet processing. Flows are often represented by tuples consisting of fields from the packet (source address, destination address, etc.) and properties associated with the packet (ingress port, quality of service, etc.). These tuples typically include an ordered string of bits representing the various flow properties forming the tuple.

In a conventional tuple-based packet processing operation, the tuple is applied to locate an entry within a flow information database having two halves—a key half, which matches the tuple, and a result half, which contains a payload used for processing packets within a flow defined by the tuple. Particularly, when the node receives a packet, it searches the database to find an entry with a key half that matches the tuple from the packet. When such an entry is found, the corresponding result half is retrieved and used to modify the packet, enqueue the packet for quality of service, and/or forward the packet out on one of the node's ports. This search-and-retrieve operation is commonly referred to as a lookup scheme.

One problem commonly encountered in configuring tuple-based lookup schemes is key size limitations. For example, a node's flow information database may only be able to accommodate keys containing 80 bits or fewer. Unfortunately, this maximum key size may be insufficient for a multi-property classification scheme that requires tuples having a larger number of bits. Another problem encountered in tuple-based lookup schemes is how to accomplish efficient "subnetting", i.e. how to effectuate a lookup scheme that provides common processing to a group of distinct flows having some common flow properties in an efficient manner.

SUMMARY OF THE INVENTION

In one embodiment, the present invention overcomes key size limitations of flow information databases through the implementation of a lookup scheme in which a tuple representing a plurality of flow properties is parsed into a plurality of subtuples for application in recursive lookups. In a first lookup stage, a first subtuple including a first subset of bits from the tuple is applied to the flow information database and returns a result including a nickname having a smaller bit count than the first subtuple. In a second lookup stage, a second subtuple including a second subset of bits from the tuple and the nickname are combined and applied to the flow information database. The lookup stages continue until a result indicates that no recursion is required. The final lookup result includes flow information applicable to one or more of modifying, enqueuing or forwarding the packet.

In another embodiment, the invention supports a truncated lookup capability enabling common processing across a group of distinct flows having common flow properties. Such common processing may be achieved by returning as part of a result in response to a non-terminal subtuple an indicator specifying that no recursion is required. These and other aspects of the present invention may be better understood by reference to the following detailed description taken in conjunction with the accompanying drawings briefly described below.

BRIEF DESCRIPTION OF THE DRAWINGS

FIG. 3A illustrates the flow information database operative within the switching interface of FIG. 2 undergoing an exemplary IP-based lookup;

DETAILED DESCRIPTION

Figure 1:
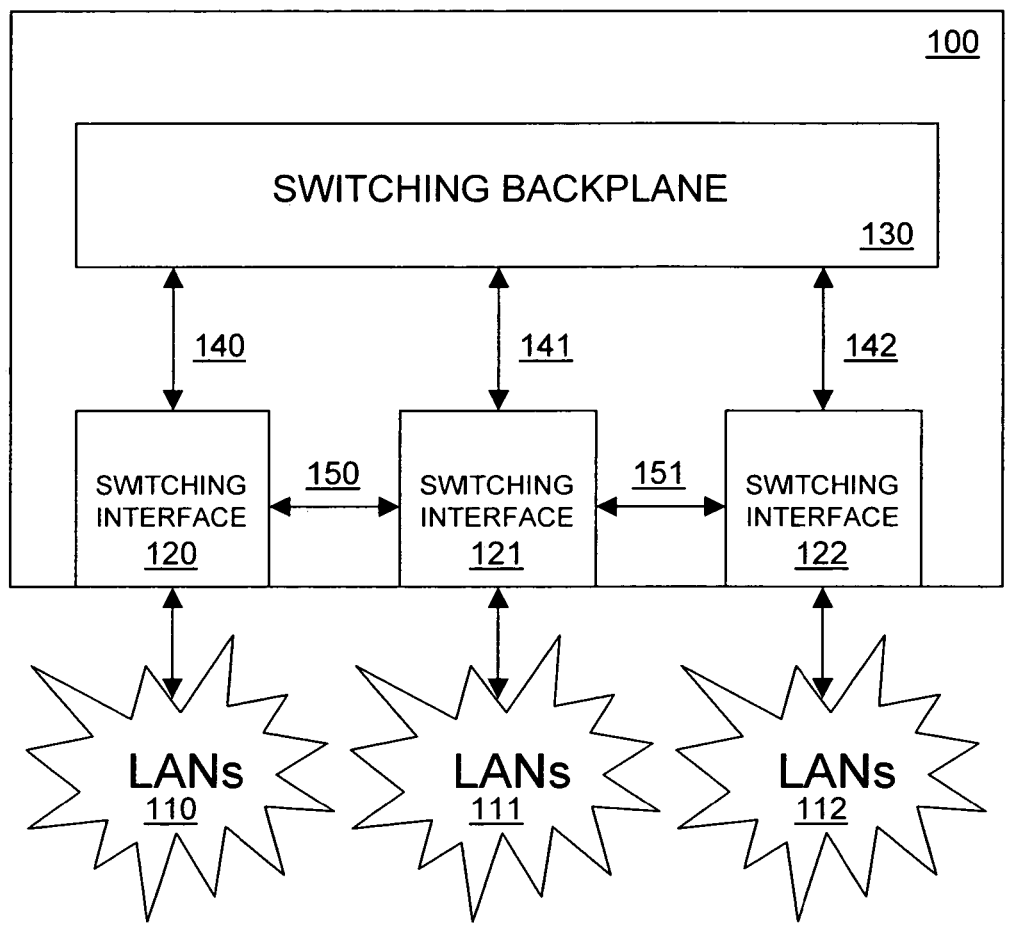
FIG. 1 illustrates a network environment including a packet switching node.

In FIG. 1, network environment including a packet switching node 100 is shown. Node 100 includes a plurality of switching interfaces 120, 121, 122 interconnected to respective groups of LANs 110, 111, 112 and interconnected to each other over data paths 140, 141, 142 via switching backplane 130 and over control paths 150, 151. Switching interfaces 120, 121, 122 forward packets to and from their respective groups of LANs 110, 111, 112 in accordance with one or more operative communication protocols, such as, for example, media access control (MAC) bridging and Internet Protocol (IP) routing.

Figure 2:
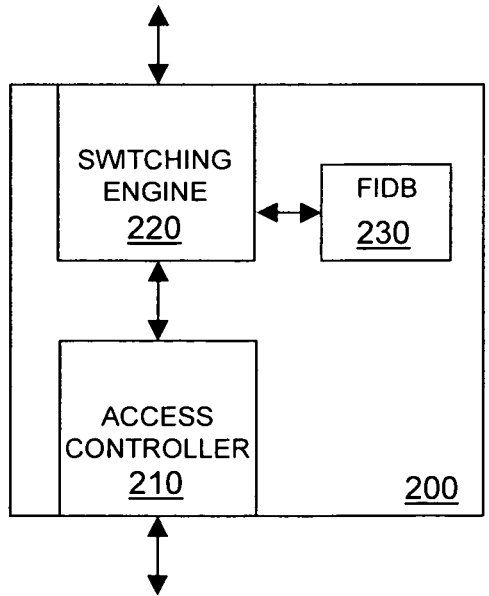
FIG. 2 illustrates a representative one of the switching interfaces operative within the packet switching node of FIG. 1.

Turning to FIG. 2, a representative one of switching interfaces 120, 121, 122, which is designated switching interface 200, is shown in greater detail. Interface 200 includes access controller 210 coupled between LANs and switching engine 220. Controller 210 receives inbound packets off LANs, performs flow-independent physical and MAC layer operations on the inbound packets and transmits the inbound packets to engine 220 for flow-dependent processing. Controller 210 also receives outbound packets from engine 220, performs physical and MAC layer operations on the outbound packets and transmits the packets on LANs. Engine 220 is preferably coupled to many elements for facilitating flow-dependent processing, including flow information database (FIDB) 230 in which lookups are performed.

Particularly, engine 220 receives inbound packets, classifies the packets, generates tuples from the packets in accordance with the classifications, parses selected ones of the tuples into subtuples, applies tuples and subtuples to flow information database (FIDB) 230, accepts results from FIDB 230 returned in accordance with the applied tuples and subtuples, modifies the packets in accordance with flow information from results and transmits the modified packets on switching backplane 130. Engine 220 also receives packets modified by other ones of interfaces 120, 121, 122 from backplane 130, subjects selected ones of the packets to egress processing and transmits selected ones of the packets to controller 210 for forwarding on LANs. Engine 220 may be implemented in well known non-programmable logic, programmable logic or a combination thereof.

Turning now to FIG. 3A, FIDB 230 is shown in greater detail undergoing an exemplary IP-based lookup. FIDB 230 includes key half 310 and result half 320. Result half 320 is further divisible into payload portion 321 and recursion indicator portion 322. FIDB 230 includes a first entry consisting of a key portion <ipda> in key half 310, a payload <nickname> in corresponding payload portion 321 and a recursion indicator <yes> in recursion portion 322. FIDB 230 includes a second entry consisting of a key portion <ipsa, port, qos, nickname> in key half 310, a payload <flowinfo> in corresponding payload portion 321 and a recursion indicator <no> in recursion portion 322.

In accordance with the IP-based lookup, switching engine 220 receives an inbound packet having an IP destination address <ipda>, an IP source address <ipsa> and a quality of service <qos> on an ingress port <port>, classifies the packet for IP routing and generates a tuple in the form <ipda, ipsa, port, qos> specified for IP routing. Engine 220 parses the tuple into a first subtuple <ipda> and a second subtuple <ipsa, port, qos> for performing an IP-based lookup.

The first subtuple <ipda> is applied to FIDB 230 and returns a corresponding first payload <nickname> and first recursion indicator <yes> to engine 220, wherein the first payload <nickname> has a smaller bit count than the first subtuple <ipda>. Since the first recursion indicator <yes> indicates that recursion is required, engine 220 combines first payload <nickname> with the second subtuple <ipsa, port, qos>, applies the combined data to FIDB 230 and returns a corresponding second payload <flowinfo> and second recursion indicator <no> to engine 220. Since the second recursion indicator <no> indicates that recursion is not required, engine 220 applies the second payload <flowinfo> in processing the packet. The second payload <flowinfo> may include flow information directly applicable in packet processing, such as, for example, modifying, enqueueing, and forwarding the packet, or may include an index applicable to another database to return flow information directly applicable in packet processing.

It will be appreciated that by resolving the first subtuple <ipda> to a first payload <nickname> having a smaller bit count than the first subtuple <ipda> and applying the first payload <nickname> with a second subtuple <ipsa, port, qos> in a recursive lookup, key size limitations inherent to FIDB 230 that would prevent a single-stage lookup of the complete tuple <ipda, ipsa, port, qos> may be advantageously overcome. Of course, it is possible within the scope of the invention to segment the tuple <ipda, ipsa, port, qos> into three or more subtuples and conduct recursive lookups by applying the terminal two or more subtuples in combination with respective ones of two or more nicknames returned from FIDB 230 in connection with respective ones of positive recursion indicators.

Figure 3B:
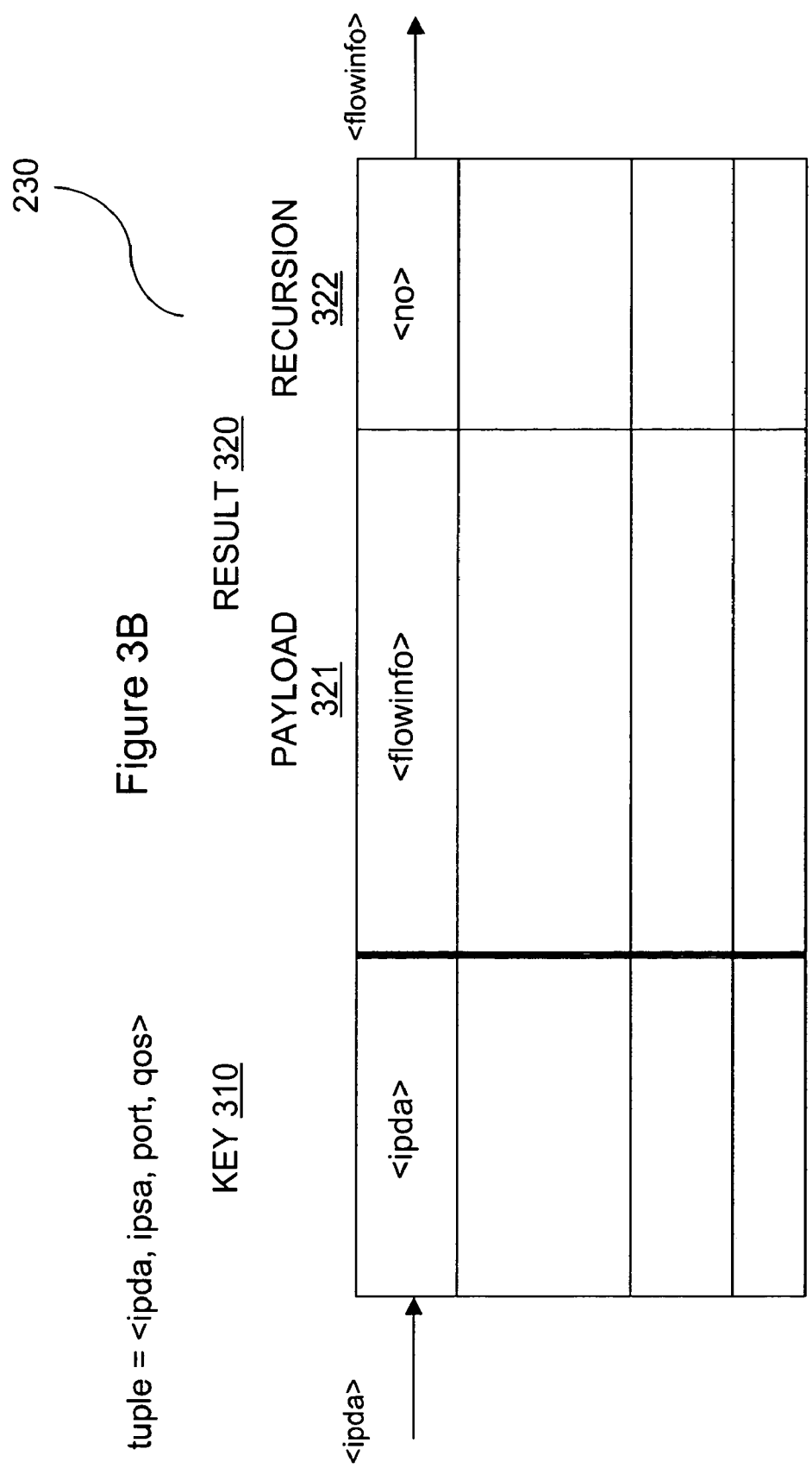
FIG. 3B illustrates the flow information database operative within the switching interface of FIG. 2 undergoing an exemplary truncated IP-based lookup.

Turning now to FIG. 3B, FIDB 230 is shown in greater detail undergoing an exemplary truncated IP-based lookup. In this example of a truncated lookup, a negative recursion indicator is returned in response to a non-terminal subtuple to effectuate common processing of all packets having a particular IP destination address <ipda>. FIDB 230 includes a first entry consisting of a key portion <ipda> in key half 310, a payload <flowinfo> in corresponding payload portion 321 and a recursion indicator <no> in recursion portion 322.

In accordance with the truncated IP-based lookup, switching engine 220 receives an inbound packet having an IP destination address <ipda>, an IP source address <ipsa> and a quality of service <qos> on an ingress port <port>, classifies the packet for IP routing and generates a tuple in the form <ipda, ipsa, port, qos> specified for IP routing. Engine 220 parses the tuple into a first subtuple <ipda> and a second subtuple <ipsa, port, qos> for performing an IP-based lookup.

The first subtuple <ipda> is applied to FIDB 230 and returns a corresponding payload <flowinfo> and recursion indicator <no> to engine 220. Since the recursion indicator <no> indicates that recursion is not required, engine 220 applies the payload <flowinfo> in processing the packet. Application of the second subtuple <ipsa, port, qos> to FIDB 230 is thereby preempted. Of course, the truncated lookup capability provided in the invention is not restricted to effectuating common processing of all packets having a common IP destination address, but may be applied to effectuate common processing of all packets having any common subset of bits within a tuple for which common processing is desired.

Figure 3C:
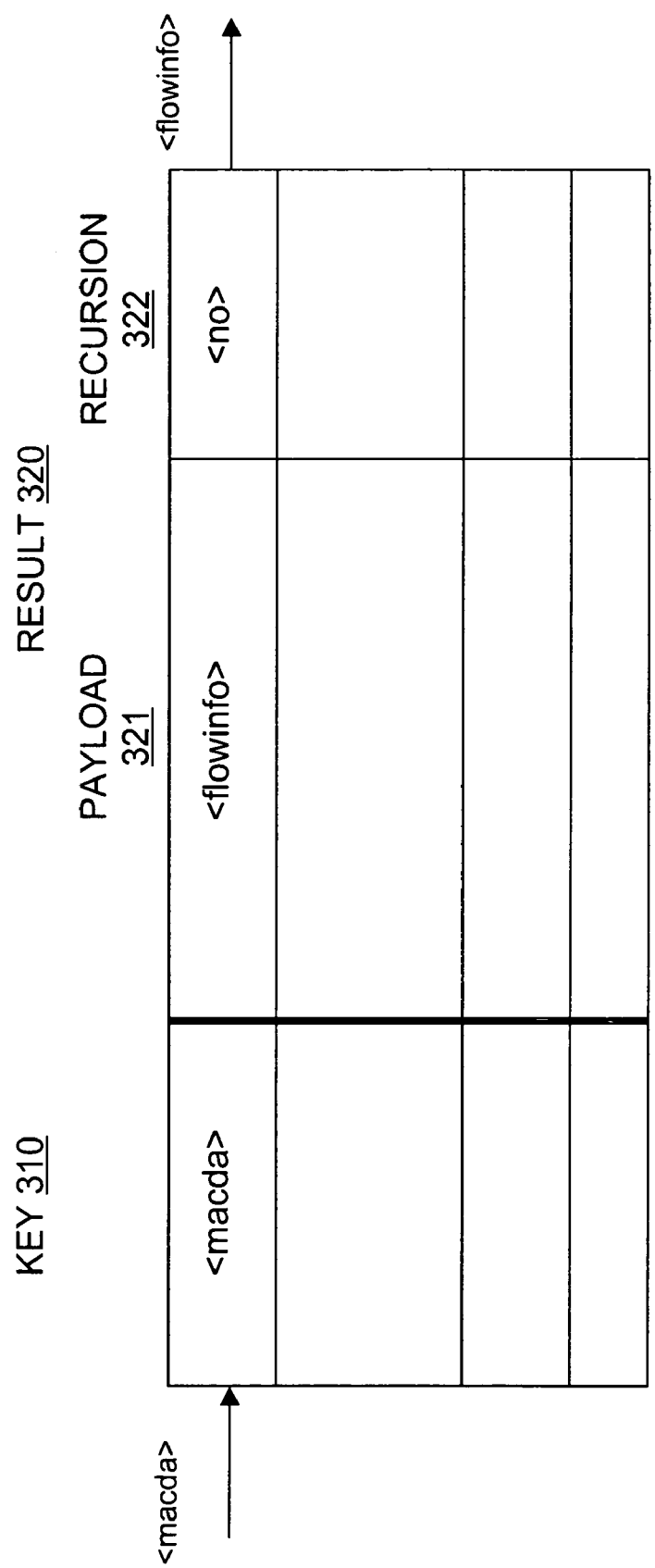
FIG. 3C illustrates the flow information database operating within the switching interface of FIG. 2 undergoing an exemplary MAC-based lookup.

Turning now to FIG. 3C, FIDB 230 is shown in greater detail undergoing an exemplary MAC-based lookup. FIDB 230 includes a first entry consisting of a key portion <macda> in key half 310, a payload <flowinfo> in corresponding payload portion 321 and a recursion indicator <no> in recursion portion 322. In accordance with the MAC-based lookup, switching engine 220 receives an inbound packet having a MAC destination address <macda> on an ingress port, classifies the packet for MAC bridging and generates a tuple in the form <macda> specified for MAC bridging. The tuple <macda> is applied to FIDB 230 and returns a corresponding payload <flowinfo> and recursion indicator <no> to engine 220. Since the recursion indicator <no> indicates that recursion is not required, engine 220 applies the payload <flowinfo> in processing the packet.

Figure 4:
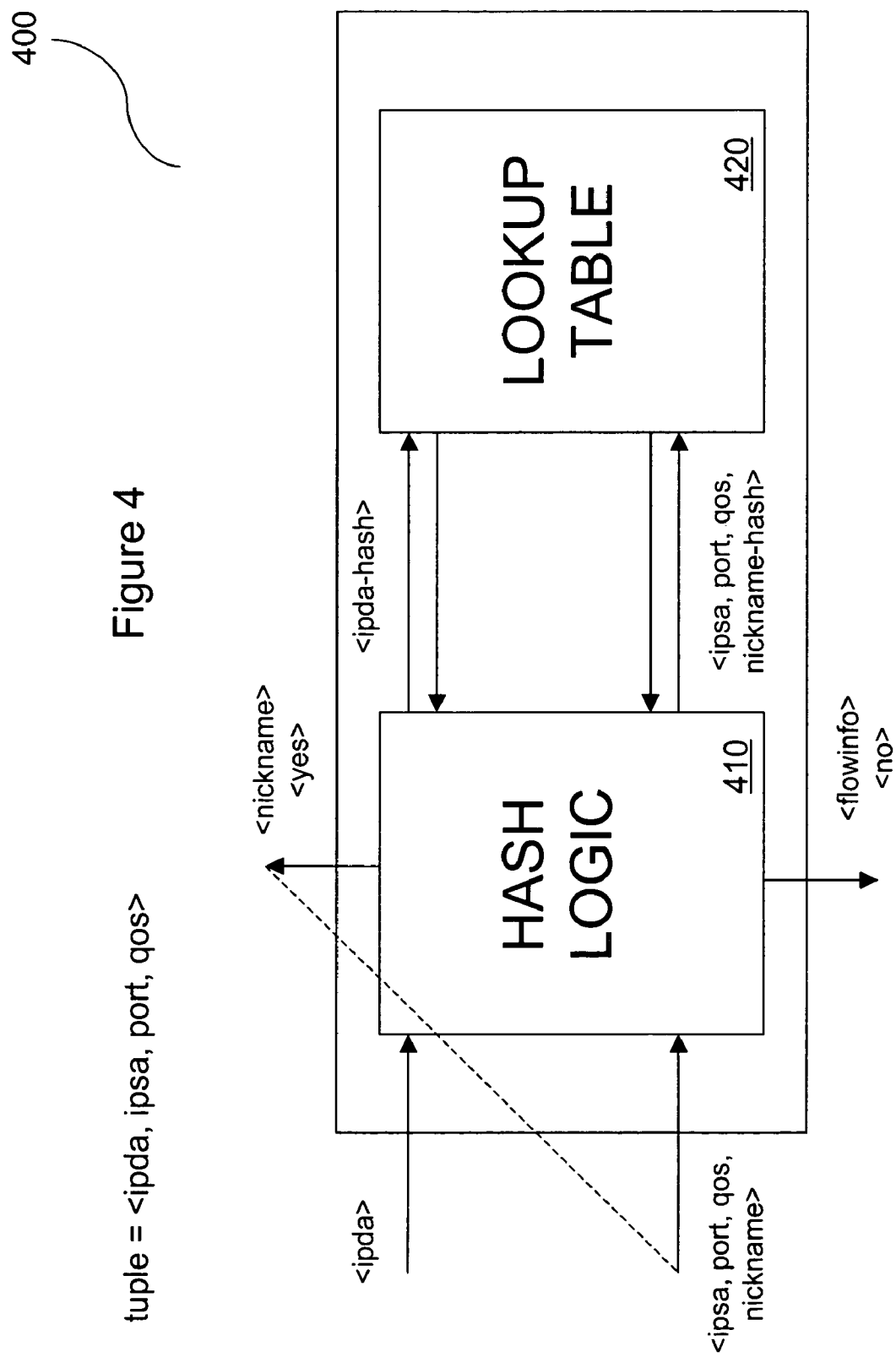
FIG. 4 illustrates an alternative flow information database including hashing logic.

Turning now to FIG. 4, an FIDB 400 in accordance with an alternative embodiment of the invention is shown to include key hashing logic 410. In accordance with an exemplary IP-based lookup conducted in FIDB 400, a switching engine (not shown) receives an inbound packet having an IP destination address <ipda>, an IP source address <ipsa> and a quality of service <qos> on an ingress port <port>, classifies the packet for IP routing and generates a tuple in the form <ipda, ipsa, port, qos> specified for IP routing.

The engine parses the tuple into a first subtuple <ipda> and a second subtuple <ipsa, port, qos> for performing an IP-based lookup. The first subtuple <ipda> is applied to FIDB 400 wherein its bit count is reduced by hashing logic 410 prior to application to lookup table 420. The reduced first subtuple <ipda-hash> is applied as an initial pointer to lookup table 420 and a linked list of entries in lookup table 420 is walked-down using "next pointers" included in the respective entries until an entry is found that includes an exact match for the first subtuple <ipda>.

When an exact match is found, the corresponding first payload <nickname> and first recursion indicator <yes> are returned to the engine. Since the first recursion indicator <yes> indicates that recursion is required, the engine combines first payload <nickname> with the second subtuple <ipsa, port, qos>, applies the combined data to FIDB 400 and the hash-and-lookup process is repeated for the second subtuple <ipsa, port, qos> whereby a corresponding second payload <flowinfo> and second recursion indicator <no> are eventually returned from the engine. Since the second recursion indicator <no> indicates that recursion is not required, the engine applies the second payload <flowinfo> in processing the packet.

Figure 5:
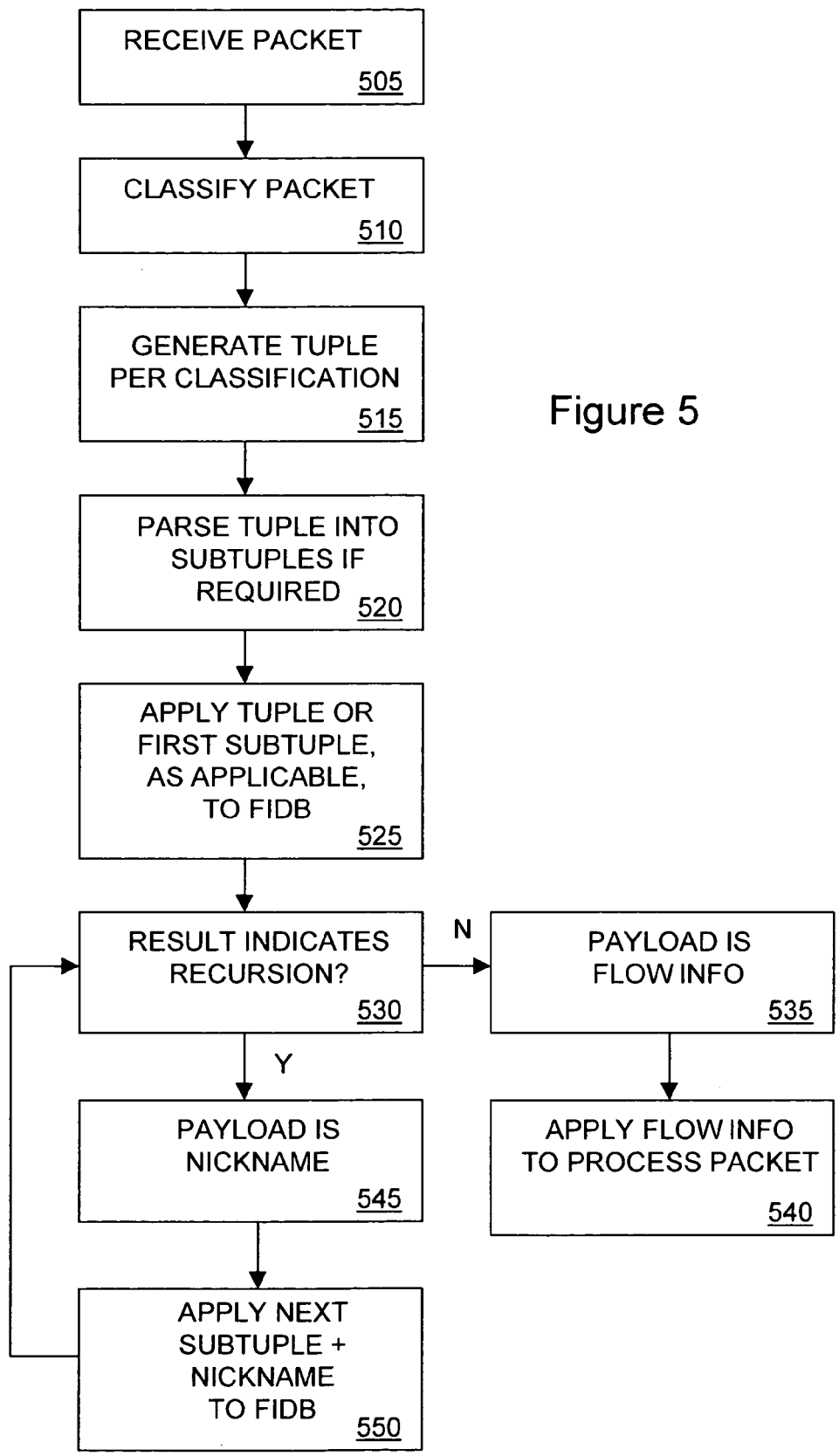
FIG. 5 is a flow diagram describing a generic tuple-based lookup scheme in accordance with a preferred embodiment of the invention.

Turning finally to FIG. 5, a flow diagram describes a generic tuple-based lookup scheme in accordance with a preferred embodiment of the invention. A packet is received (505) and classified (510). A tuple including one or more flow properties is generated in accordance with the classification (515) and is parsed into multiple subtuples if required (520). The tuple or, if the tuple was parsed the first subtuple, is applied to the FIDB (525) and returns a result including a payload. A check is made to determine if the result indicates recursion (530). If the result does not indicate recursion, the returned payload is the flow information (535) and the flow information is applied to process the packet (540). If the result, however, indicates recursion, the payload is a nickname and the nickname is applied with the next subtuple to the FIDB in a recursive lookup (550).

It will be appreciated by those of ordinary skill in the art that the invention can be embodied in other specific forms without departing from the spirit or essential character hereof. The present description is therefore considered in all respects to be illustrative and not restrictive. The scope of the invention is indicated by the appended claims, and all changes that come within the meaning and range of equivalents thereof are intended to be embraced therein.

We claim:

1. A method for determining packet processing data, comprising the steps of:
   inputting a first lookup key including a first portion of a tuple;
   determining a nickname in response to the first lookup key, the nickname having a lower bit count than the first lookup key;
   outputting the nickname;
   inputting a second lookup key including a second portion of the tuple and the nickname; and
   outputting packet processing data in response to the second lookup key.

2. The method according to claim 1, wherein the ones of outputting steps further include outputting respective ones of recursion indicators sufficient to indicate a need for inputting an additional lookup key.

3. The method according to claim 1, wherein the ones of outputting steps further include outputting ones of indicators, respectively, sufficient to indicate an absence and presence, respectively, of packet processing data.

4. The method according to claim 1, wherein the ones of outputting steps further include outputting ones of indicators, respectively, sufficient to indicate a presence and absence, respectively, of a nickname.

5. A switching interface for a data communication switch, comprising:
   means for inputting a first lookup key including a first portion of a tuple;
   means for determining a nickname in response to the first lookup key, the nickname having a lower bit count than the first lookup key;
   means for outputting the nickname;
   means for inputting a second lookup key including a second portion of the tuple and the nickname; and
   means for outputting packet processing data in response to the second lookup key.

6. The switching interface according to claim 5, further comprising means for outputting respective ones of recursion indicators sufficient to indicate a need for inputting an additional lookup key.

7. The switching interface according to claim 5, further comprising means for outputting ones of indicators, respectively, sufficient to indicate an absence and presence, respectively, of packet processing data.

8. The switching interface according to claim 5, further comprising means for outputting ones of indicators, respectively, sufficient to indicate a presence and absence, respectively, of a nickname.

* * * * *